Jan. 17, 1956     A. J. SCHNELLER     2,730,727
FOLDABLE SEAT AND BED CONSTRUCTION
Filed Oct. 9, 1952     4 Sheets-Sheet 1
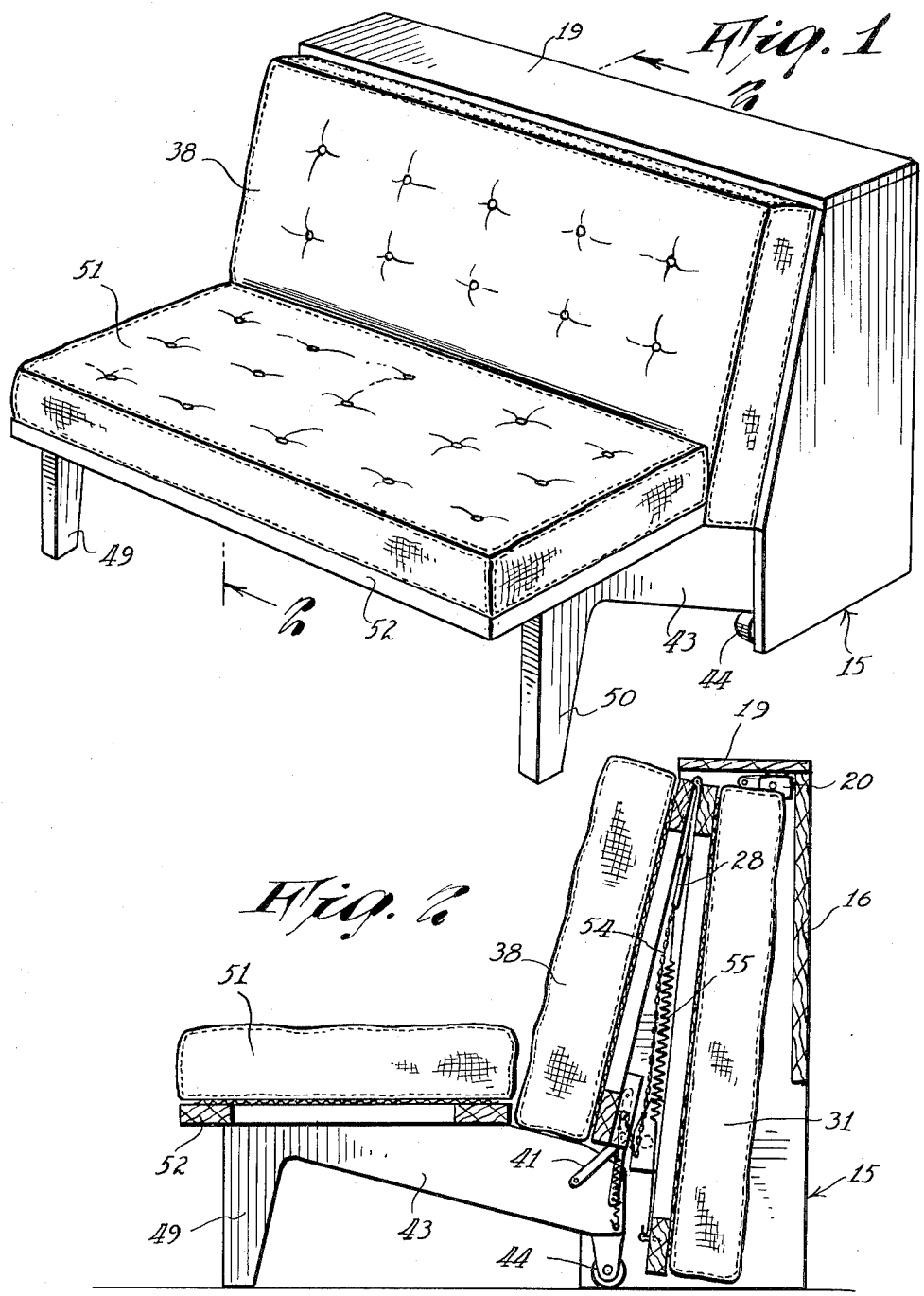
INVENTOR.
ARTHUR J. SCHNELLER
BY
ATTORNEY

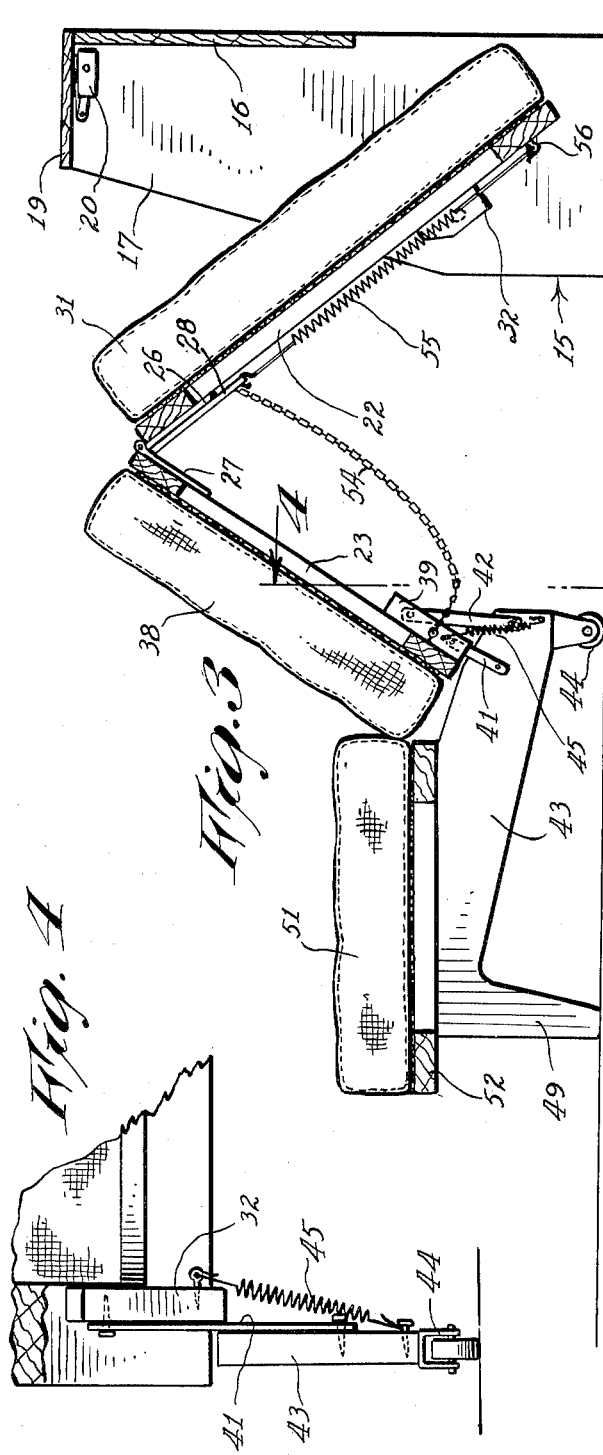

Jan. 17, 1956                A. J. SCHNELLER                2,730,727
                    FOLDABLE SEAT AND BED CONSTRUCTION
Filed Oct. 9, 1952                                    4 Sheets-Sheet 3
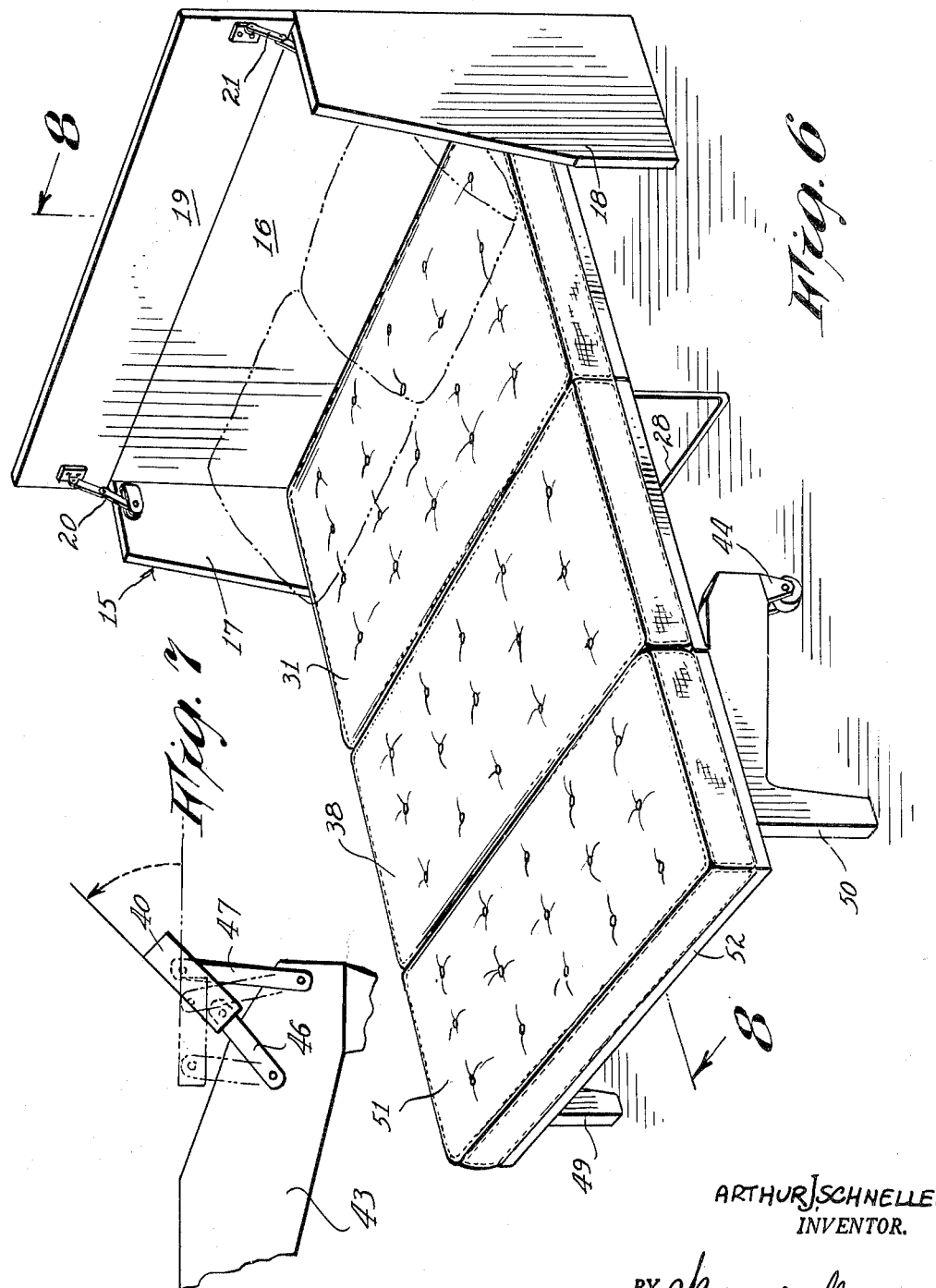
ARTHUR J. SCHNELLER
INVENTOR.
BY
ATTORNEY

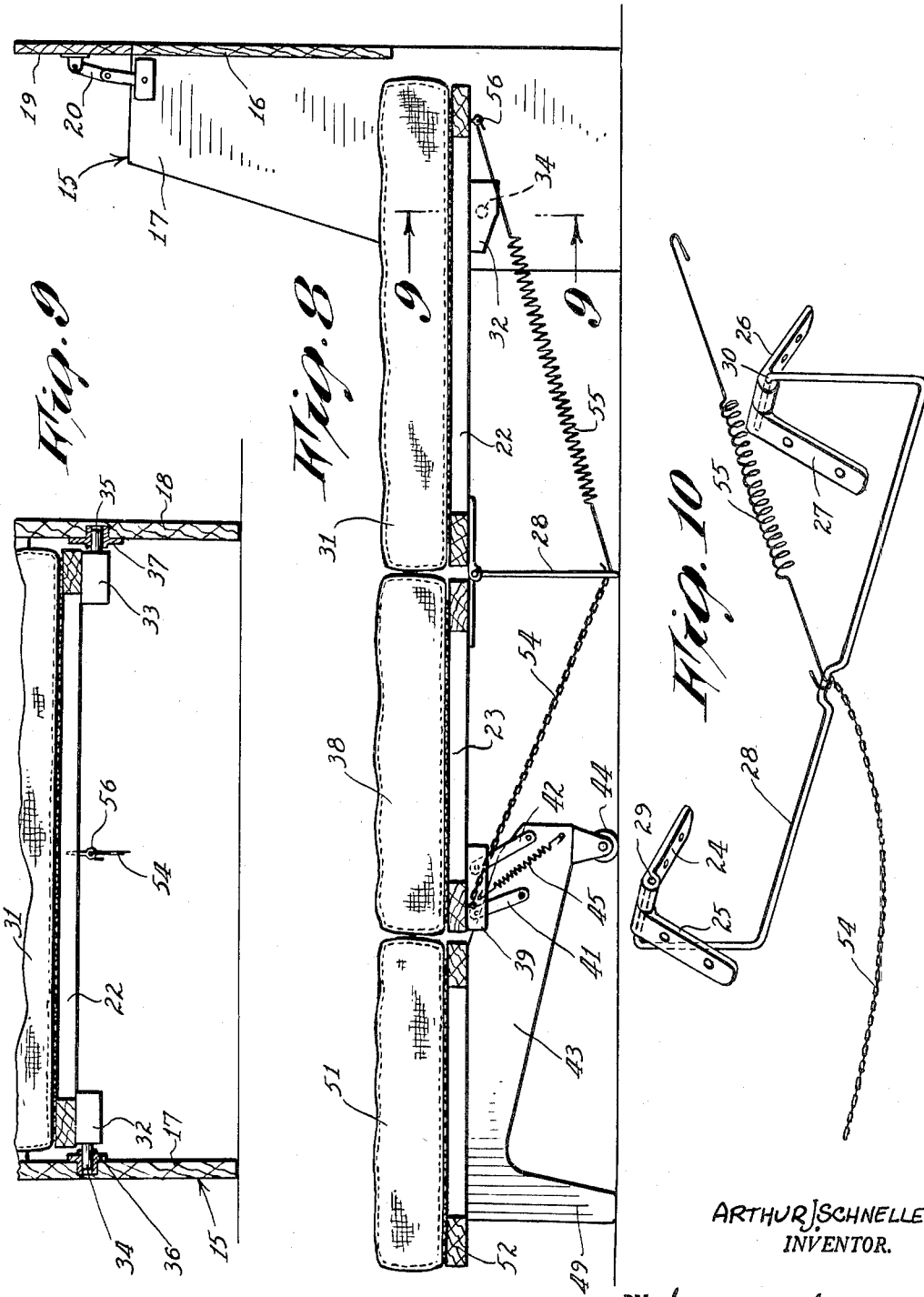

United States Patent Office 2,730,727
Patented Jan. 17, 1956

2,730,727

FOLDABLE SEAT AND BED CONSTRUCTION

Arthur J. Schneller, Brooklyn, N. Y.

Application October 9, 1952, Serial No. 313,825

1 Claim. (Cl. 5—38)

This invention relates to foldable seat construction.

It is an object of the present invention to provide a foldable seat formed of sections which can be folded into a stationary back shell when the seat is used with a back and wherein by a simple pulling forwardly of the seat section, the other two sections, which may be contained in the back shell, are pulled forward and extended so as to convert quickly and easily the seat construction into a bed or couch for sleeping.

It is another object of the invention to provide a combination seat and bed construction wherein a simple means is provided for the support of the two foldable parts which are joinable with the hinge members connecting the two sections or parts and which takes up little space when the sections are folded and yet serves as an adequate support for the two foldable sections and wherein the spring arrangement is attached to the support to automatically fold the support as the parts or sections are folded into the back shell, and wherein the support is extended automatically as the sections are pulled out of the back shell.

Other objects of the invention are to provide an adjustable seat construction having the above objects in mind, which is simple, inexpensive to manufacture, has a minimum number of parts, compact, easy to extend and fold, of pleasing appearance, rugged and durable, and efficient in operation.

For other objects and for a better understanding of the invention reference may be had to the following detailed description taken in connection with the accompanying drawings, in which:

Figure 1 is a perspective view of the seat construction arranged as a seat with the back sections folded into the back shell;

Fig. 2 is a vertical sectional view taken on line 2—2 of Fig. 1;

Fig. 3 is a vertical sectional view of the sections being extended from the back shell, but still in partially folded positions;

Fig. 4 is an enlarged fragmentary sectional view looking upon the control links for one of the sections with the support of the first section and as viewed on line 4—4 of Fig. 3;

Fig. 5 is a fragmentary perspective view looking upon the control links of one of the foldable sections and their connection with the seat section support;

Fig. 6 is a perspective view of the seat construction converted into a bed or couch and with the sections fully extended and the hinge support lying vertically to support the foldable sections;

Fig. 7 is a fragmentary illustrative view showing the position of the control links for the intermediate section and illustrating the manner in which they are moved to be located in positions to elevate one of the back sections;

Fig. 8 is a longitudinal sectional view of the sections fully extended from the back shell and as viewed on line 8—8 of Fig. 6;

Fig. 9 is a transverse sectional view taken through the connection of the one back section with the back shell and as viewed on line 9—9 of Fig. 8;

Fig. 10 is a fragmentary and perspective view of the hinged bar support and of the hinges to which the bar support is connected and of the spring and chain connected therewith.

Referring now to the figures, 15 represents a back shell having a partial back wall 16, side end members or walls 17 and 18, and a hinged top cover 19. The cover is retained in its raised position as shown in Fig. 6, by collapsible devices 20 and 21, secured to the end walls 17 and 18, respectively and to the underface of the top cover 19.

Adapted to be folded into the back shell 15 are foldable sections 22 and 23 which are connected together by hinge parts 24 and 25 and hinge parts 26 and 27 that are connected together by the ends of a foldable rod support 28. The ends of this rod support 28 are folded upwardly and inwardly to provide respectively hinge pin formations 29 and 30. The hinge pin formation 29 extends through the hinge members 24 and 25 to join them together and the pin formation 30 extends through the hinge members 26 and 27 to join them together. The hinge members 24 and 26 are connected to the foldable section 22 and the hinge members 25 and 27 are connected to the foldable section 23.

The foldable back portion 22 has a mattress or cushion 31 secured to it in any suitable manner and has pivot pin brackets 32 and 33 from which pin projections 34 and 35 respectively extend. The pin projection 34 extends into a bearing 36 in the end wall 17 and the pin projection 35 extends into a bearing 37 in the end wall 18 of the back shell.

The seat section 23 supports a cushion 38 and has depending blocks 39 and 40 depending from the forward underpart of the section 23. The depending block 39 has two supporting links 41 and 42 pivotally connected thereto and longitudinally spaced from each other and the lower ends of these links are respectively pivotally connected to the seat frame or carriage 43 which has roll supports 44 on the rear end thereof. A spring 45 tends to hold the forward edge of the back section 23 in its extended position.

Connected to the block 40 are spaced links 46 and 47 which are in turn pivotally connected to the seat frame 43. A tension spring 48 serves to hold the forward edge of the back section 23 in place upon the seat frame 43.

The forward part of the seat frame 43 has depending forward legs 49 and 50 which can be lifted to make use of the roll devices 44 as the sections of the seat construction are brought forward for folding into the back stationary shell 17. A cushion 51 is fixed to a seat section 52 and this seat section 52 is in turn fixed to the top of the frame 43.

In order that the rod support 28 will be automatically positioned as the seat sections are pulled forwardly or folded into the back shell, a chain 54 is connected between the forward edge of the back section 23 and the rod support 28. On the opposite side of the rod support 28 there is connected a tension spring 55 which connects with the rear edge of the back section 22, as indicated at 56.

As viewed in Fig. 1, it will be seen that the back sections can be easily and readily folded into the back shell 15 and that the sections will extend in a vertical direction one folded upon the other with the hinge members lying under the top cover 19 of the shell.

In order to extend the seat portions, it is merely necessary to lift the seat section 52 and the frame 43 at the front edge thereof and upon the rollers and moving backwardly with the seat sections to draw the frame 43 forwardly and the sections 22 and 23 out of the shell 15. In doing this, the chain 54 will, as the sections are finally extended, pull the rod support 28 forwardly to a vertical position, shown in Fig. 8, and against the action of the tension spring 55. When the seat sections are returned, the tension spring 55 will pull the rod support 28 into a straight position between the sections 22 and 23 as shown in Fig. 2.

The springs 45 and 48 acting between the blocks 39 and 40 and the frame 43 will hold the links and support the forward edge of the frame 23 in their forward, over-center position shown in Fig. 8, whereby to prevent the upward folding of the rear sections when the sections are extended and in the position shown in Fig. 8 without some application of force to move the supporting links for the section 23 over-center.

While various changes may be made in the detail construction, it shall be understood that such changes shall be within the spirit and scope of the present invention, as defined by the appended claim.

What is claimed is:

A combination seat and bed construction comprising a back shell, a cushioned section pivotally connected to the back shell for fore and aft movement, a second cushioned section, said cushioned sections having hinge members joined together, a support depending from the hinge members, a cushioned seat section including a frame movable over the floor surface and having roller devices on the rear part thereof, supporting link devices connected between the second cushioned section and the sides of the frame of the seat cushioned section, said supporting link devices adapted to move between over center positions and having spring means for holding the second cushioned section in the over center positions, flexible cable means extending between the hinge support and the forward part of the second cushioned section and tension spring means extending between the hinge support and the rear part of the first cushioned section.

References Cited in the file of this patent

UNITED STATES PATENTS

| | | |
|---|---|---|
| 1,003,780 | Newrath | Sept. 19, 1911 |
| 1,180,926 | Jeffcott | Apr. 25, 1916 |
| 1,903,918 | Fraser et al. | Apr. 18, 1933 |
| 2,162,503 | Gunn, Jr. | June 13, 1939 |

FOREIGN PATENTS

| | | |
|---|---|---|
| 333,637 | Great Britain | Aug. 2, 1930 |